United States Patent
Luo et al.

(10) Patent No.: US 6,803,679 B1
(45) Date of Patent: Oct. 12, 2004

(54) PARALLEL REDUNDANT POWER SYSTEM AND METHOD FOR CONTROL OF THE POWER SYSTEM

(75) Inventors: Han-Sheng Luo, Baoan Shenzhen (CN); Shou-Long Tian, Baoan Shenzhen (CN); Chia-Ming Tsai, Yung-He (TW)

(73) Assignee: Phoenixtec Power Co., Ltd., Taipei (TW)

( * ) Notice: Subject to any disclaimer, the term of this patent is extended or adjusted under 35 U.S.C. 154(b) by 0 days.

(21) Appl. No.: 10/677,896

(22) Filed: Oct. 2, 2003

(51) Int. Cl.[7] ............................. H02M 7/00; H02J 7/00
(52) U.S. Cl. ........................................... 307/66; 363/65
(58) Field of Search ...................... 307/64, 82; 363/65, 363/50, 68, 69, 71

(56) References Cited

U.S. PATENT DOCUMENTS

| | | |
|---|---|---|
| 5,257,180 A | 10/1993 | Sashida et al. |
| 5,745,356 A | 4/1998 | Tassitino et al. |
| 6,118,680 A | 9/2000 | Wallace et al. |
| 6,356,471 B1 | 3/2002 | Fang |
| 6,438,007 B1 * | 8/2002 | Pilukaitis et al. .............. 363/65 |
| 6,522,030 B1 * | 2/2003 | Wall et al. ..................... 307/43 |
| 2001/0045815 A1 * | 11/2001 | Muratov et al. ............ 323/280 |

OTHER PUBLICATIONS

Chiang, Hsuang–Chang et al., "A Frequency–Dependent Droop Scheme for Parallel Control of UPS Inverters", Jul. 7, 2001, Journal of Chinese Institute of Engineers, vol. 24, pp. 699–708.*

* cited by examiner

*Primary Examiner*—Gregory J. Toatley, Jr.
(74) *Attorney, Agent, or Firm*—William E. Pelton, Esq.

(57) ABSTRACT

A parallel redundant power system and a method for control the same, wherein the power system is composed by UPS modules with outputs coupled in parallel to supply power to a load through a bus. The control method employs the P-ω and Q-V slope lines of the droop method to perform phase locking and current sharing. Moreover, the method further utilizes the internal impedance of the UPS in accompaniment with a current shift method to simulate an actual inductor being coupled to the output of the UPS module so as to satisfy the droop method. Therefore, the drawbacks otherwise caused from actual inductors such as the large size and heave weight are eliminated.

17 Claims, 10 Drawing Sheets

PARALLEL REDUNDANT POWER SYSTEM AND METHOD FOR CONTROL OF THE POWER SYSTEM

BACKGROUND OF THE INVENTION

1. Field of the Invention

The present invention is related to a method for controlling a parallel redundant power system composed of UPS modules coupled in parallel, and more particularly to a method that utilizes the internal impedance of the UPS modules in accompaniment with a current shift method to simulate a virtual inductor so that the drawbacks caused from the actual inductor are eliminated.

2. Description of Related Arts

With the almost total-dependence of modern societies on electricity for employment, living, communication and entertainment, any disruption to an electricity supply brings about a temporary halt to civilization as we know it. Especially in the present age where a breathtaking variety of electronic products are widely used, serious economic loss may possibly occur if a company loses critical data when the electricity supply is suddenly interrupted.

To solve the above problem, the uninterruptible power supply (UPS) is developed. However, because of the quick evolvement of the load specifications, a single UPS device may be unable to satisfy the electricity requirement, especially when the amount of the loads is increased. Therefore, it is a natural trend to design the UPSs as modules to perform a parallel redundant power supply system.

The control techniques for the parallel redundant power supply system are mainly categorized into two types, the wired-connected mode and connectionless mode. For example; U.S. Pat. No. 5,257,180 "Controlling system for parallel operation of AC output inverters with restrained crossed current" adopts the wire-connected mode. In another aspect, the connectionless mode is applied in U.S. Pat. No. 5,745,356 "Independent load sharing of AC power systems connected in parallel", U.S. Pat. No. 6,118,680 "Methods and apparatus for load sharing between parallel inverters in an AC power supply" and U.S. Pat. No. 6,356,471 "Dynamic feedback adaptive control system and method for paralleling electric power source and an uninterruptible power supply including the same".

At present, many kinds of loads need the steady electricity supply for operating normally whereby strict control of the power quality in the parallel configuration is essential. One example of the connectionless mode being superior to the wire-connected mode is that the connectionless mode does not have the problem of system-level failure of single point failure, whereby the entire UPS system can achieve the highest reliability. In U.S. Pat. No. 5,745,356, only the DC energy is calculated and only the differentiation of the active power is concerned; however the reactive power is difficult to control. The differentiation manner in the prior art has some further drawbacks, such as the low anti-interference ability and being unable to process harmonic waves. In U.S. Pat. No. 6,118,680, the phase locking is determined by whether the voltage area is zero. Not only should the calculation accuracy be considered, but also whether the output voltage contains the harmonic wave must be considered. Further, with regard to the active power and the reactive power, U.S. Pat. No. 6,118,680 can not provide an efficient control manner. In U.S. Pat. No. 6,356,471, an inductor must be additionally coupled to the output of the power system in parallel.

The basic concept of the parallel connectionless operation is from the parallel connection of the power generators in the power system. However, there are still some different physical characteristics between the UPS and the power generator. The internal impedance of the generators represents as a large reactance, whereas on the contrary, the UPS has a small internal resistance.

With reference to FIG. 1, by simulating the power generator models to perform the parallel configuration of the UPS modules, the output terminal of each UPS module is coupled with a large inductor ($Z_1$, $Z_2$) in series.

The UPS module is simulated by an ideal voltage source $\vec{V}_{oi} = |\vec{V}_{oi}| < \delta_i$ and an equivalent impedance $Z_{oi}$, wherein the impedance represents the resistance character. Further, $Z_{si} = jX_{si}$ represents the output inductance of the "$i^{th}$" UPS module (i is an ordinal), and $Z_{si}$ is much larger than $Z_{oi}$, ($Z_{si} >> Z_{oi}$). If the internal impedance $Z_{oi}$ of the UPS module is ignored, the output power of the UPS module is calculated by the following equation:

$$P_{oi} = \frac{|\vec{V}_{oi}| \cdot |\vec{V}_o|}{X_{si}} \sin \delta_i \qquad (1)$$

$$Q_{oi} = \frac{|\vec{V}_{oi}| \cdot |\vec{V}_o| \cos \delta_i - |\vec{V}_o|^2}{X_{si}} \qquad (2)$$

According to the equation (1), the active power $P_{oi}$ is directly proportional to the phase angle $\delta_i$ that is defined between the $\vec{V}_{oi}$ and $\vec{V}_o$. The reactive power is approximately directly proportional to the $|\vec{V}_o|$ to represent the output voltage amplitude.

FIGS. 2A and 2B show a first line indicating the relationship between the active power and frequency and a second line indicating the relationship between the reactive power and voltage.

$$\omega = \omega_o - k_\omega * P \qquad (3)$$

$$V = V_{o-kV} * Q \qquad (4)$$

where $\omega_o$ can be set to 50 Hz or 60 Hz, and $V_o$ can be set to 120Vac or 230Vac depended on the power output requirement.

Based on the equations (1) to (4), the parallel connectionless configuration is able to be established by the droop method.

With reference to FIG. 3, the relationship between the output voltage of each UPS module and the total output voltage of all UPS modules is shown by two vectors.

In FIG. 3, vector $\vec{V}_{oi}$ means the equivalent output voltage of the inverter of the $i_{th}$ UPS module (i is an ordinal), and $\vec{V}_o$ represents the output voltage that is composed by all parallel connected UPS modules. In the condition that $\vec{V}_o$ remains at a constant, when the frequency of $\vec{V}_{oi}$ is increasing, the phase angle $\epsilon_i$ will accordingly increase. Further, the reactive power output from the ith UPS module also gets larger based on equation (1). According to equation (3) and the relationship of P–ω, the increase of the active power will cause the decrease in the frequency of $\vec{V}_{oi}$, thus the phase angle $\delta_i$ will be accordingly decreased. If the frequency of $\vec{V}_{oi}$ is decreased, the same result still will occur. Finally, the $\vec{V}_{oi}$ and $\vec{V}_o$ will finally have the same frequency and the phase angle $\delta_i$ between the $\vec{V}_{oi}$ and $\vec{V}_o$ is keep at a constant.

With reference to FIG. 2B, the relationship between the reactive power and the voltage amplitude is shown. In the event of $V_o^*$ remains at a constant, when the output voltage of $V_{oi}^*$ is increasing, the reactive power output from the UPS $i^{th}$ UPS module will accordingly increase based on equation (2). Further referring to the Q-V relationship in equation (4), the output voltage amplitude will then decrease. The balance relationship between $V_{oi}^*$ and $V_o^*$ will ensure that both the amplitude of $V_{oi}^*$ and $V_o^*$ can remain at a static status.

From the foregoing description, the droop method can be applied to accomplish the parallel connectionless operation on the premise that the output of each UPS module is coupled with a large inductor. Since the inductor is composed of windings, the entire size and weight of the UPS system will become extremely large and heavy if the inductor is coupled to the output of the UPS module. Moreover, when the load is coupled to the UPS system, the impedance of the inductor will interfere with the output voltage adjustment accuracy of the UPS system. Thus, one way to solve the problem is to remove the inductor from the UPS system. However, some necessary requirements such as the function of the parallel connectionless operation, the volume and weight of the UPS module, and the output adjustment accuracy etc. will be hard to be satisfied.

SUMMARY OF THE INVENTION

The main objective of the present invention is to provide a control method for a parallel power system to solve the problems caused from an actual inductor, such as its large size and heavy weight. The present invention is able to efficiently control both active power and reactive power. Moreover, because the present invention does not employ differentiation or integration to perform phase locking, the problem of harmonic wave is avoided. Further, even when the present invention is not coupled with an actual inductor to the output of the UPS, the droop method is still able to be achieved.

To accomplish the main objective, the method of the present invention comprises:

sensing an output current of a UPS module;

shifting a phase of the output current of the UPS module with an angle;

calculating an active power and a reactive power based on the shifted output current;

adjusting the frequency of the output voltage of the UPS module based on the P-ω slope line; and adjusting the amplitude of the output voltage of the UPS module based on the Q-V slope line.

A second objective of the present invention is to provide a parallel redundant power system being able to be operated without the actual control wires connected among UPS modules.

The connection means of the preferred embodiment of this invention is described as following is an example. The system is composed of multiple UPS modules connected in parallel, wherein each output of each UPS module is collectively connected to a power output distributor (POD) to form the parallel connection and then provide power to a load, wherein each UPS module further includes:

an inverter having an output terminal;

a PWM driving circuit to drive the inverter;

an inductor current detector coupled to the output terminal of the inverter;

an output voltage detector coupled to the output terminal of the inverter;

a load current detector coupled to the output terminal of the inverter; and a control unit coupled to the PWM driving circuit, the inductor current detector, output voltage detector and the load current detector.

The control unit performs a current-shifting manner to make all UPS modules be connected in parallel.

The control unit is able to be accomplished by a digital signal processor (DSP) together with a software in the DSP.

DETAILED DESCRIPTION OF THE PREFERRED EMBODIMENT

Figure 4:
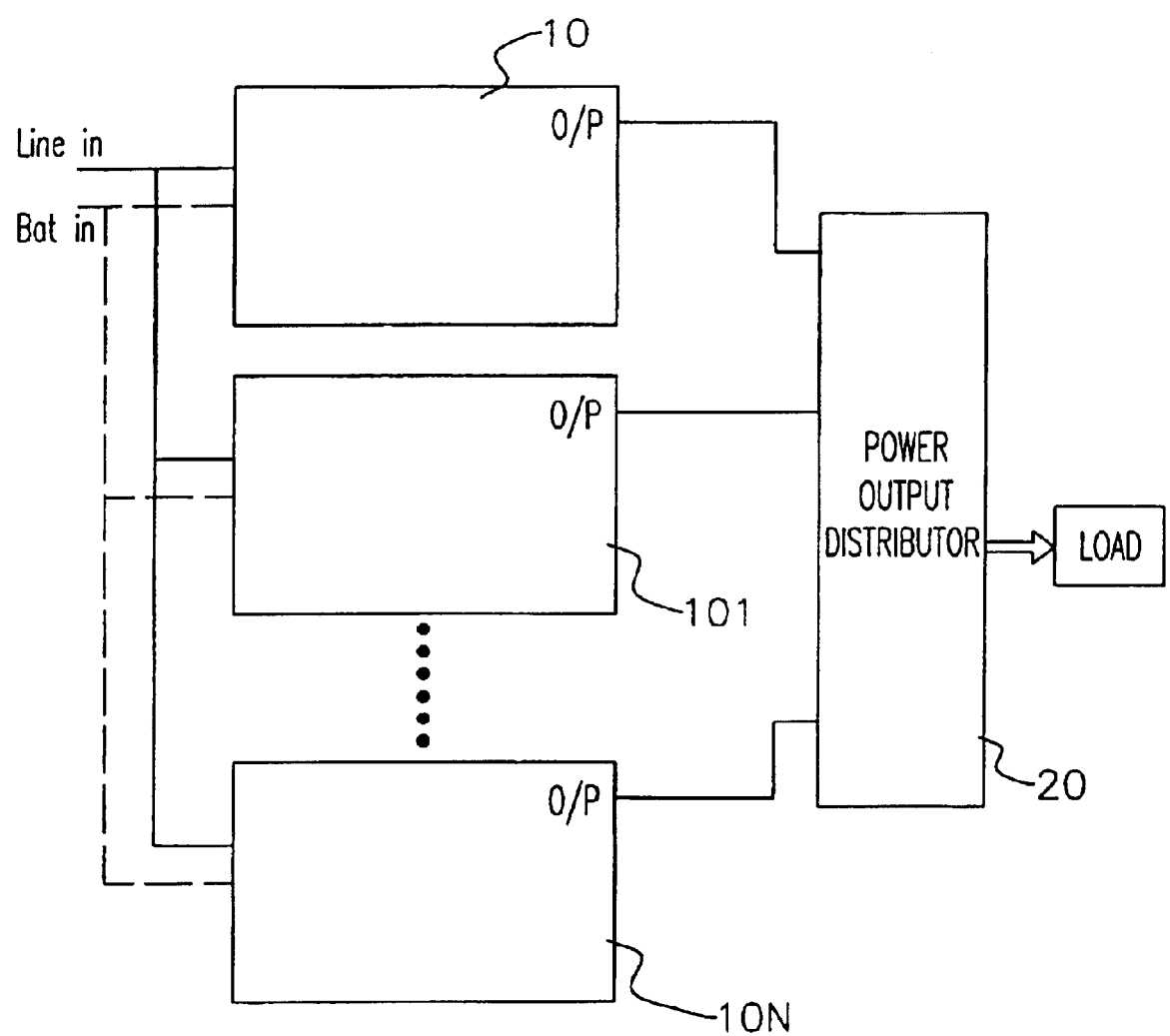
FIG. 4 is a block diagram of a parallel redundant power system composed of multiple UPS modules in accordance with the present invention.

With reference to FIG. 4, a parallel redundant UPS system is composed of multiple UPS modules (10)(101–10N) connected in parallel. If the output power of each UPS module (10)(101–10N) is high, all UPS modules (10)(101–10N) are coupled in parallel and through a power output distributor (POD)(20) to provide the combined power to a load. Otherwise, if the output power of each UPS module (10)(101–10N) is low, all the UPS modules (10)(101–10N) can coupled together via wires and then collectively provide the power to the load without the use of the POD (20). It should be noted that the present invention does not only apply to the parallel connected UPS modules, but also can control parallel connected AC inverters.

For each UPS module (10)(101–10N) in FIG. 4, the input voltage and the output voltage both are single phase (R-phase) in this embodiment. It should be noted that the present invention is able to be applied on a power system with more than one phase AC input and output voltage. For example, two additional phases (S-phase and T-phase) are added to the power system, wherein the inverter of each UPS module (10)(101–10N) need not be modified, and the phase-locking circuit and by-pass circuit both are still operated based on the R-phase.

Figure 1:
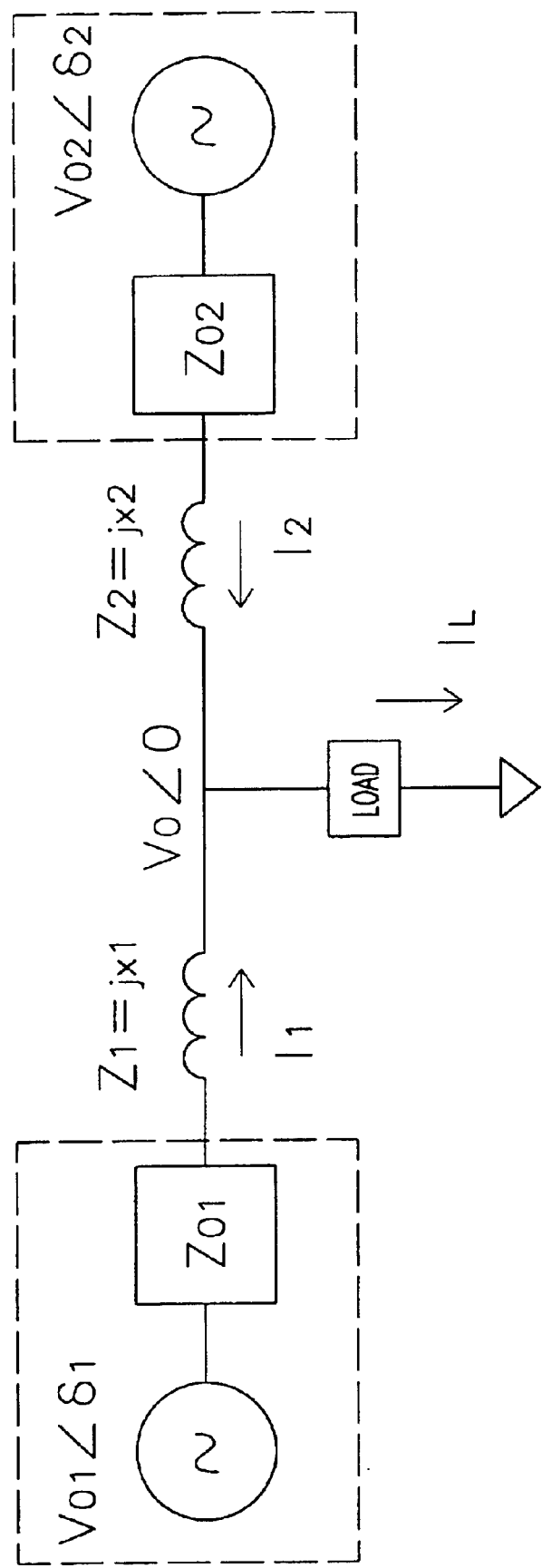
FIG. 1 is a block diagram showing two UPS modules coupled in parallel.
Figure 2A:
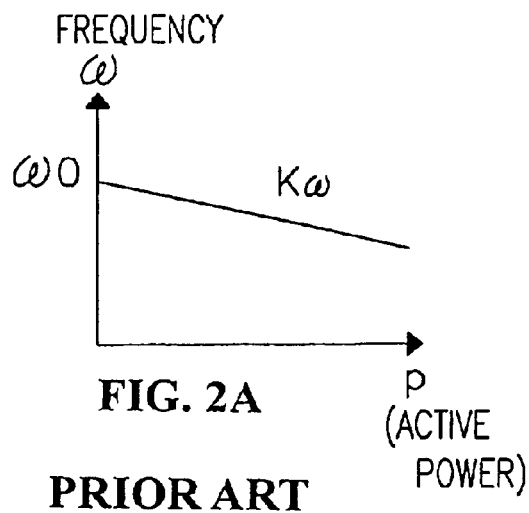
FIG. 2A shows a slope line representing the relationship between the frequency and the active power.
Figure 2B:
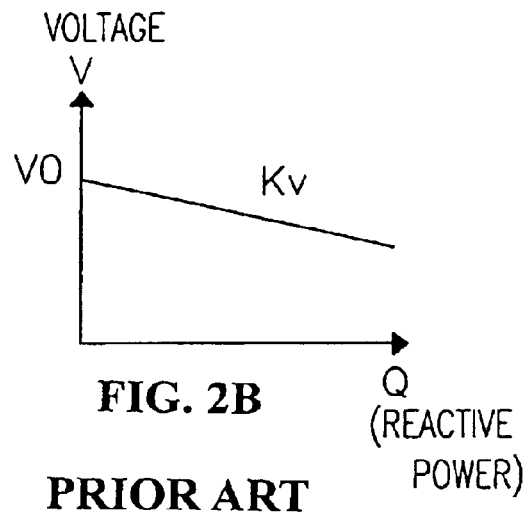
FIG. 2B shows a slope line representing the relationship between the voltage and the reactive power.
Figure 3:
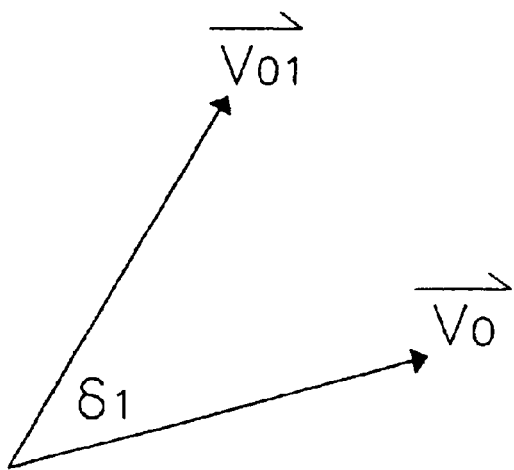
FIG. 3 shows two vectors that respectively represent an output voltage of at least one UPS module and a combined output voltage of a parallel redundant power system.
Figure 5A:
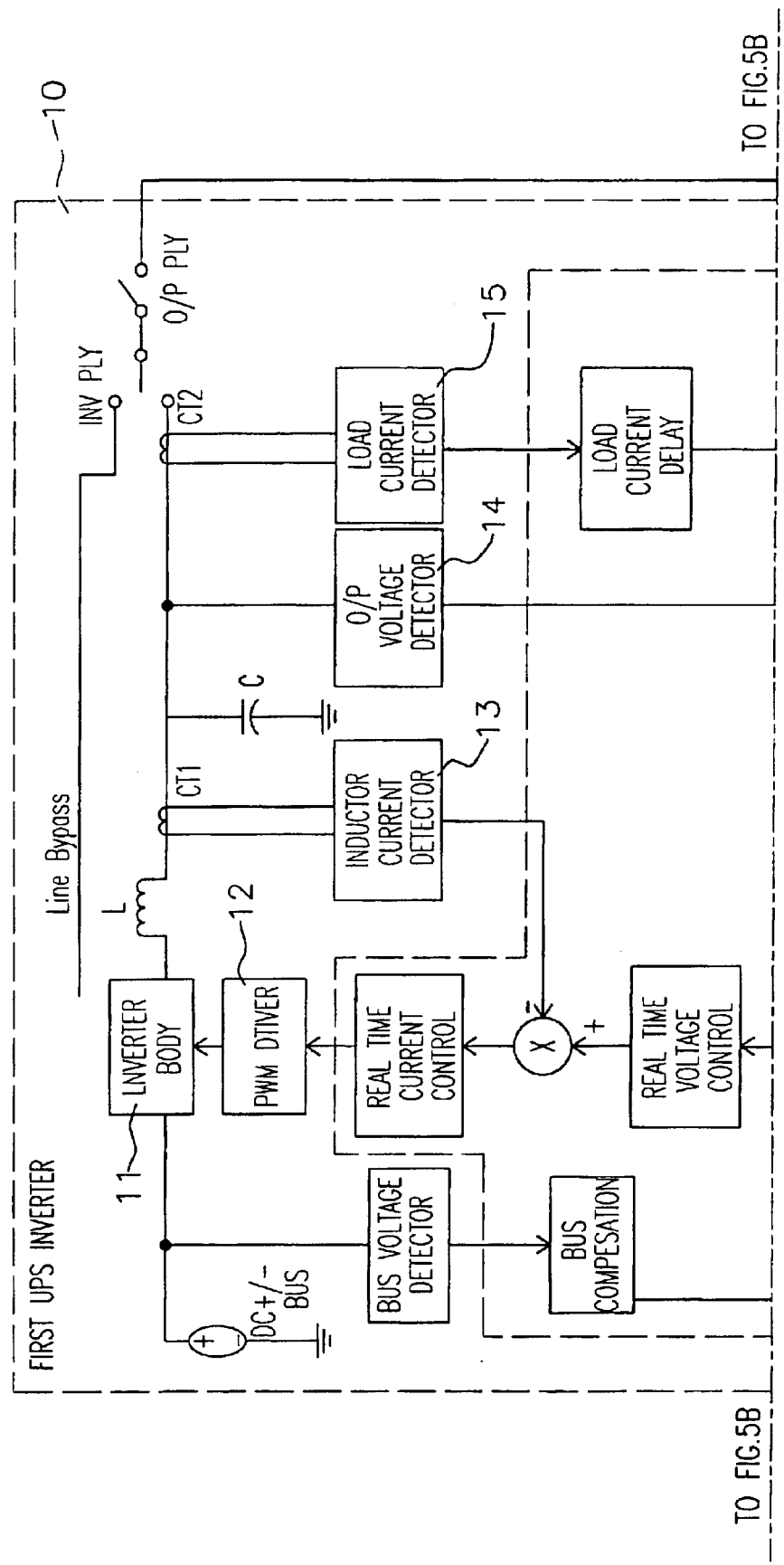
FIGS. 5A–5B are block diagrams showing a UPS module shown in FIG. 1 in detail.
Figure 5B:
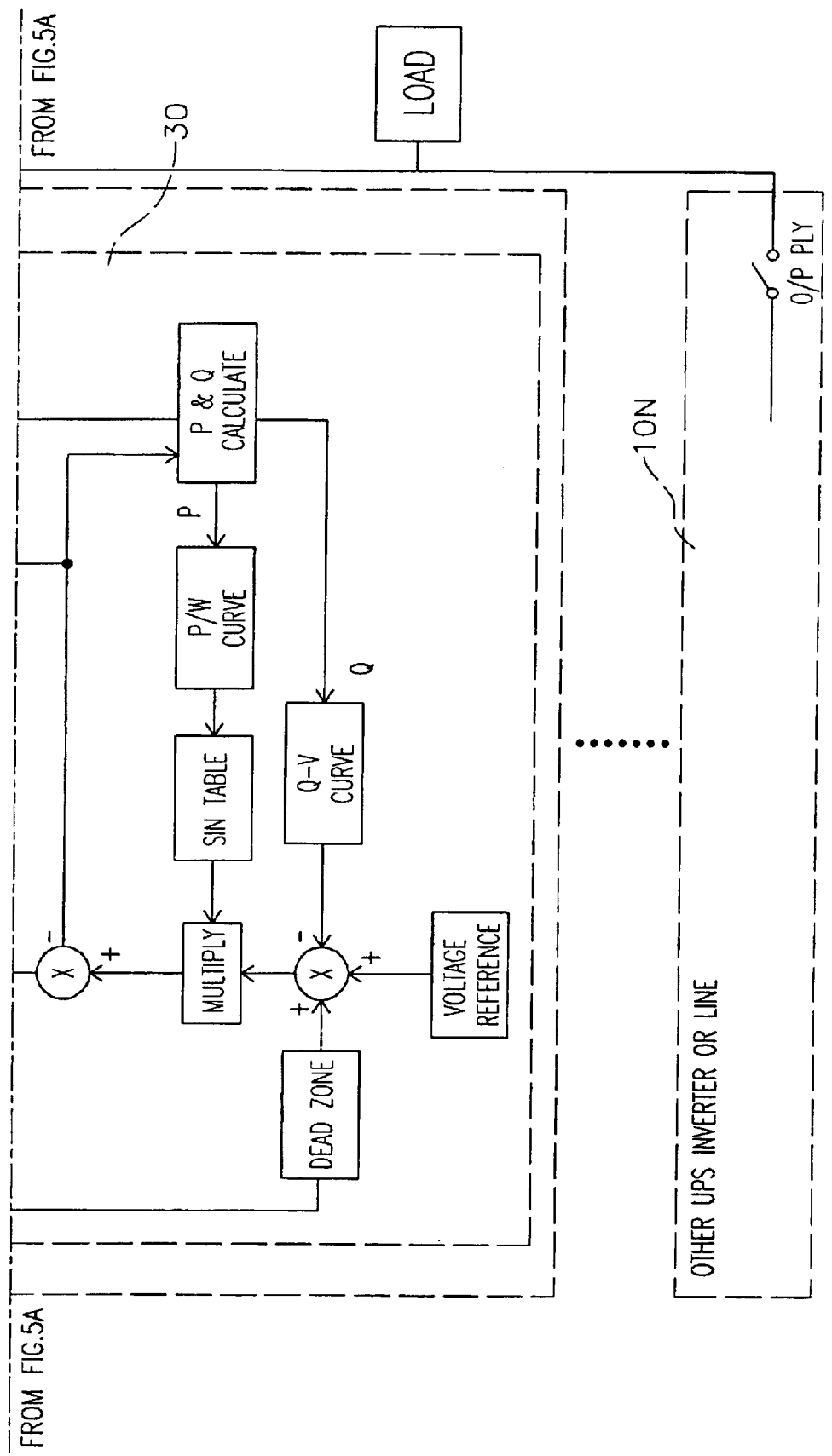

With reference to FIGS. 5A–5B, as an example, only one UPS module (10) in FIG. 1 is illustrated in detail by functional block diagrams. The UPS module (10) comprises an inverter (11), a PWM driver (12) to drive the inverter (11), an inductor current detector (13) coupled to the output of the inverter (11), an output voltage detector (14), a load current detector (15) and a control unit (30). The control unit (30) is performed by a digital signal processor (DSP) in accompaniment with the software.

Figure 6:
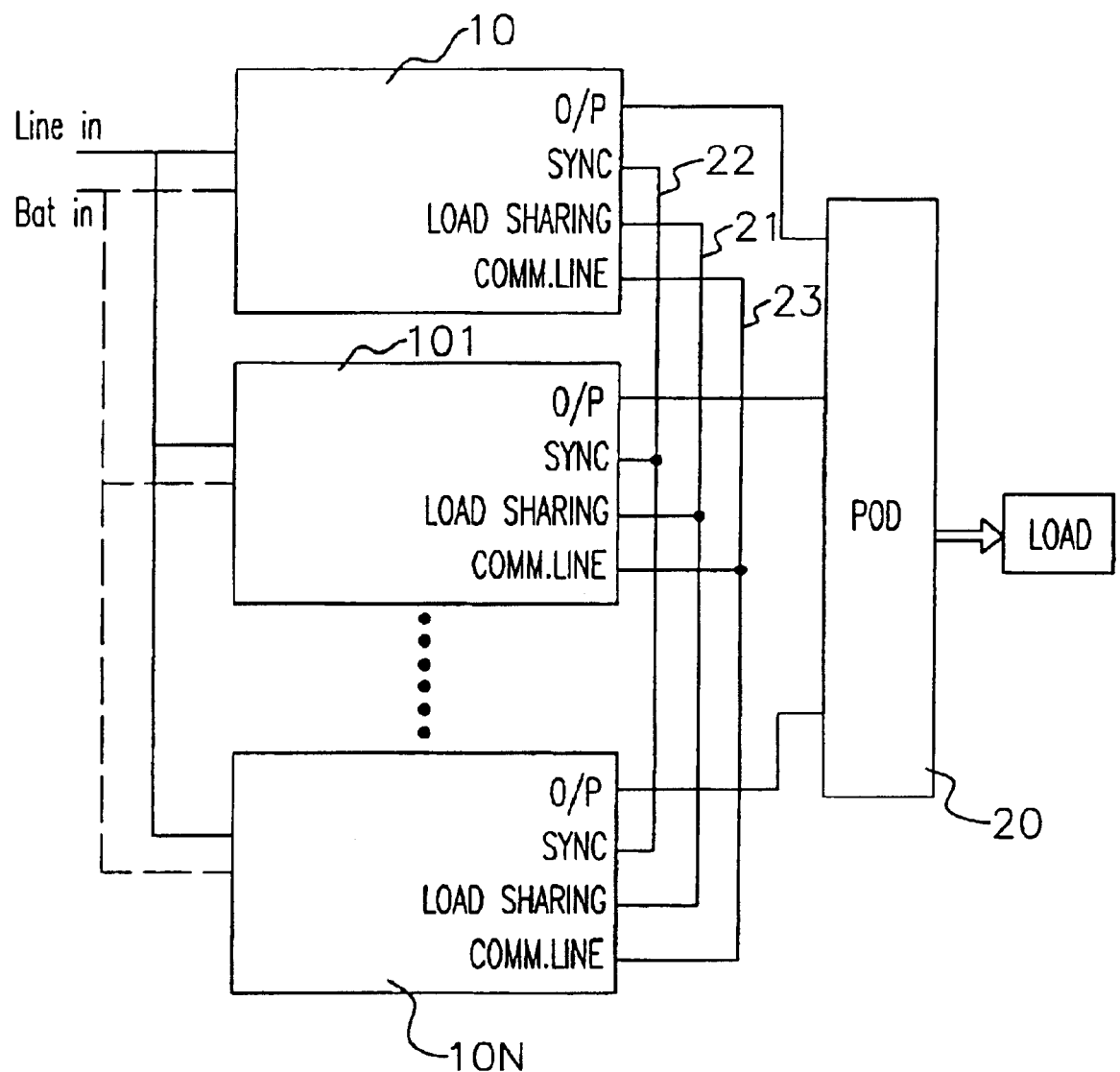
FIG. 6 is a block diagram showing the parallel redundant power system being operated by a wired-connected mode.

As the preferred embodiment shown in FIGS. 5A–5B, there are no signal wires connected among the UPS modules (10)(101–10N) except the power line (O/P). With such a configuration, all parallel UPS modules (10)(101–10N) are controlled through a connectionless mode. However, the connectionless mode can be modified to apply to a wired-connected parallel power system. With reference to FIG. 6, besides the above mentioned power line (O/P), several signal wires are applied to interconnect all UPS modules (10)(101–10N) in parallel. These signal wires include three types, a load sharing current wire (21), a synchronizing clock signal wire (22) and a communication wire (23).

The load sharing current wire (21) is provided to exchange output current information among the parallel UPS modules (10)(101–10N), wherein the voltage value measured over the load sharing wire (21) represents an average value of all output current values of the UPS modules (10)(101–10N).

The synchronizing clock signal wire (22) controls the phase lock of all UPS modules (10)(101–10N), whereby all output voltage of the UPS modules (10)(101–10N) have synchronal phases.

The communication wire (23) is used to control information exchange among the parallel UPS modules (10)(101–10N) whereby the operating status of each individual UPS module (10)(101–10N) can be monitored in real time.

Since the foregoing different types of signal wires actually connect among these parallel UPS modules (10)(101–10N), the entire power system is controlled by a technique called "wired-connected mode".

Figure 7A:
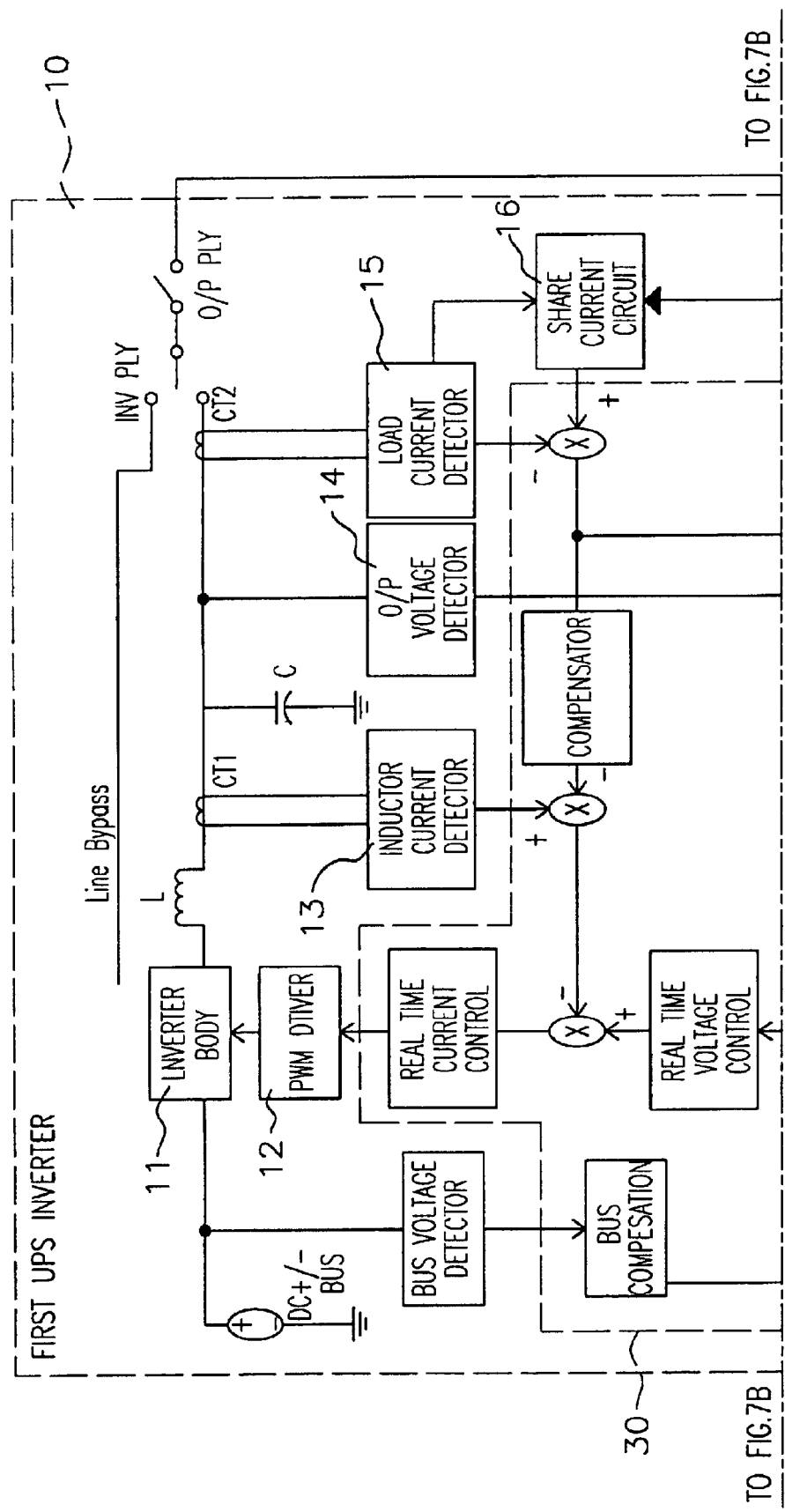
FIGS. 7A–7B are a block diagrams showing a UPS module shown in FIG. 6 in detail.
Figure 7B:
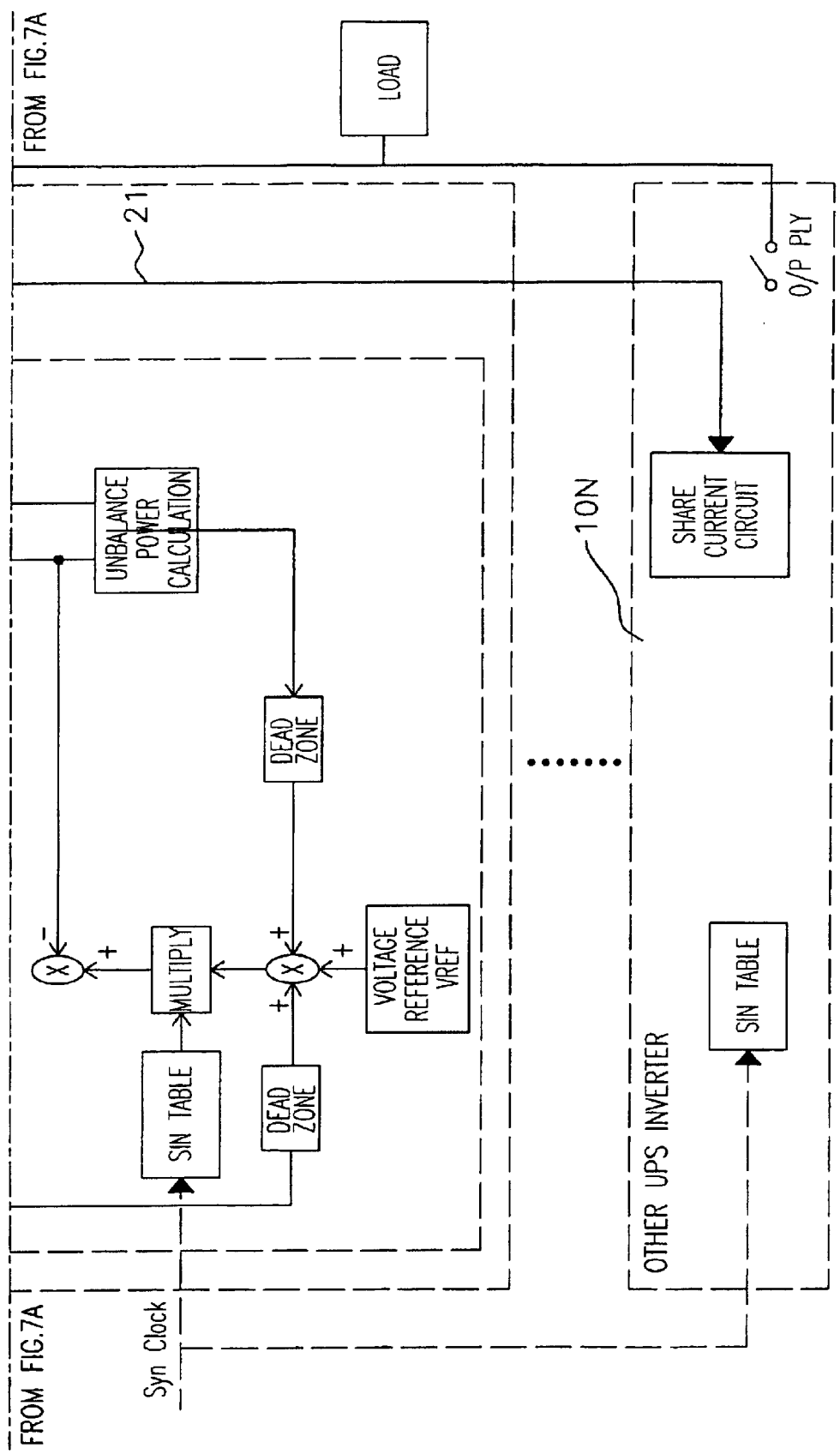

With reference to FIGS. 7A–7B, when all UPS modules (10)(101–10N) are controlled under the wired-connected mode, each UPS module (10) still has the inverter (11), the PWM driver (12), the inductor current detector (13), the output voltage detector (14), the load current detector (15) and the control unit (30) as shown in FIGS. 5A–5B. Furthermore, all load current detectors (15) are connected via share current circuits (16) and the load sharing wire (21), wherein the controlling of all parallel UPS modules (10–10N) are dependent upon the current information detected by the share current circuits (16).

Since the wire-connected mode is not the objective of the present invention, the related detailed description is omitted hereinafter.

In order to improve the reliability of the parallel power system and to obviate the problem of single point failure that might otherwise occur in a situation wherein the control signals communication fail, the present invention adopts a connectionless (wireless) mode. The connectionless mode utilizes the droop method and the simulated P–ω and Q–V slope lines, to accomplish the phase locking and current sharing.

Based on the foregoing description related to the parallel connectionless operation in the background of the invention, a premise to accomplish the connectionless operation is that the output of the UPS module must be coupled with a large inductor in series. However, the coupled inductor would cause the enlargement of the UPS module size and the increase of the weight. Therefore, the present invention utilizes the internal impedance of the UPS module in accompaniment with a technique called current phase shifting calculation, to simulate a virtual inductor being coupled with the UPS module. Moreover, the present invention further concerns the cross current in the UPS module, the reactive power and the active power of the cross current to perform the parallel connectionless operation.

The above mentioned current phase shifting calculation is explained hereinafter. When comparing a first UPS module that couples with an inductor with a second UPS module that has no inductor coupled thereto, wherein the two UPS modules are further assumed to have the same output current values, a phenomenon is observed that the phases of the output currents of the two UPS modules are different. The phase of the first UPS module is lag that of the second UPS module. A difference between two phases is represented by an angle Based on such a phenomenon, if the output current phase of a UPS module is shifted with an angle, the UPS module is deemed as having a virtual inductor coupled at the output thereof, whereby the equations (1) to (4) mentioned in the background of the invention are able to be employed to perform the parallel connectionless operation.

However, if the reactive power and the active power are calculated based on the shifted output current, the calculated values are not the actual reactive power and the actual active power. Thus, the calculated values are virtual values so they are presented by VP (virtual active power) and VQ (virtual reactive power) hereinafter.

Figure 8:
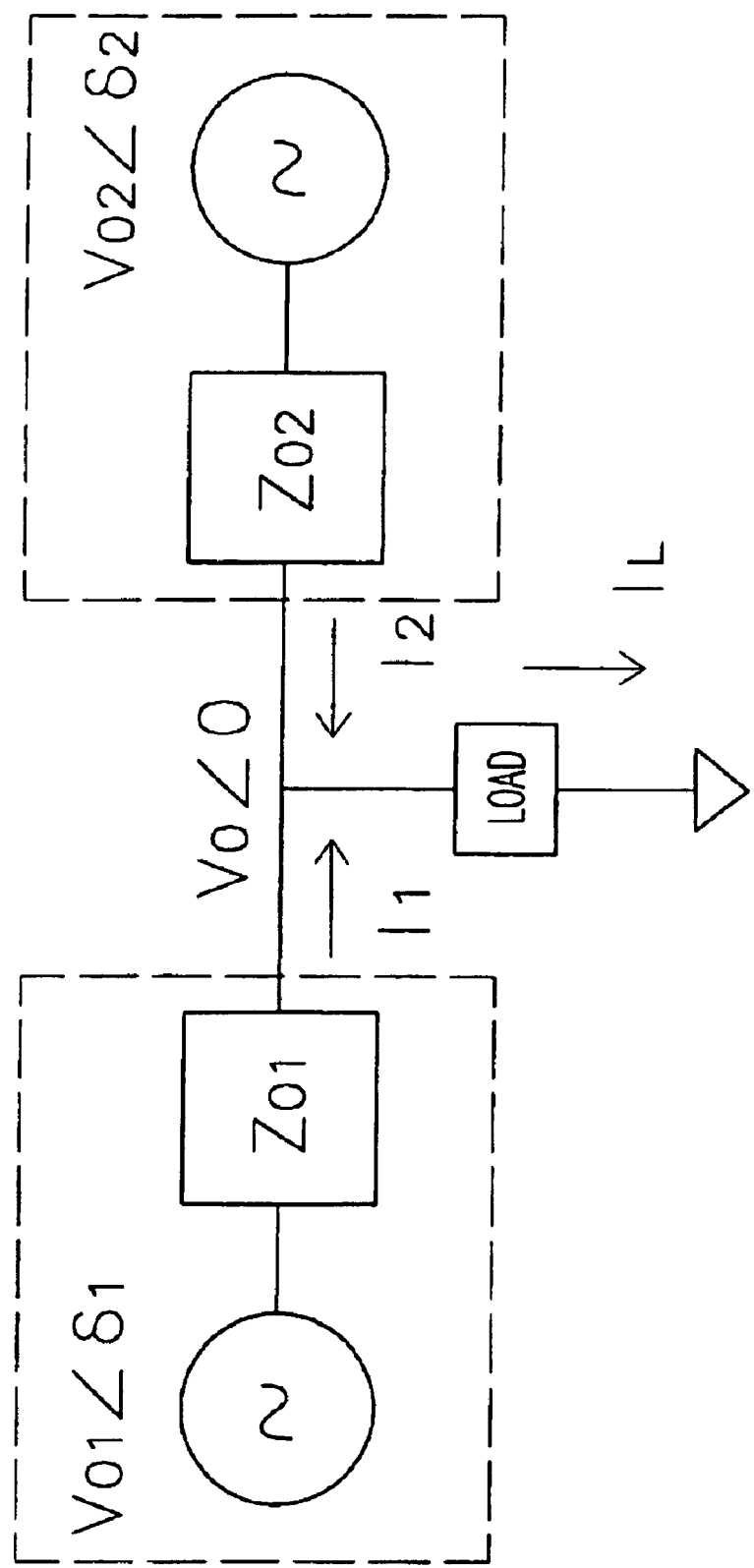
FIG. 8 is a block diagram showing two UPS modules coupled in parallel without any actual inductors.

With reference to FIG. 8, two or more UPS modules are configured to form a parallel redundant power system, wherein there is no actual inductor coupled to the output of each UPS module. Each UPS module is represented by an ideal voltage source $\vec{V}_{oi}$ and an internal impedance $Z_{oi}$, wherein the total composed output voltage is represented by $\vec{V}_o$.

Several symbols that are used hereinafter are firstly defined as follows.

$\vec{V}_o = |\vec{V}_o| < 0$: A composed output voltage of the parallel power system, composed by output voltages of all UPS modules, wherein the phase of the composed output voltage $\vec{V}_o$ is deemed as a reference phase.

S: A total output power of the parallel redundant power system.

$\vec{I}_L = |\vec{I}_L| < \theta$: An output current of the parallel redundant power system, wherein an angle θ is defined when comparing the output current phase with the composed output voltage $\vec{V}_o$.

$\vec{V}_{oi}$: An output voltage of an $i^{th}$ UPS module, where i is an ordinal.

$\vec{I}_u$: An output current of the $i^{th}$ UPS module.

$\delta_i$: A phase difference between the $\vec{V}_{oi}$ and $\vec{I}_u$ of the $i^{th}$ UPS module, wherein the phase difference is represented by an angle.

$\alpha_i$: A phase difference obtained by comparing a cross current vector of the $i^{th}$ UPS module with the composed output voltage $\vec{V}_o$.

$\xi_i$: A phase difference obtained by comparing an internal impedance $Z_{oi}$ of the $i^{th}$ UPS module with the composed output voltage $\vec{V}_o$.

$S_i(t)$: A transient output power of the ith UPS module.

If there are "n" UPS modules coupled in parallel and the quantities of the loads are S, the total output current is expressed by equation $\vec{I}_{L1} + \vec{I}_{L2} + \Lambda + \vec{I}_{Ln} = \vec{I}_L$. When all UPS modules properly share the total current, the equation $$|\overrightarrow{I_{Li}}| \approx \left|\frac{\overrightarrow{I_L}}{n}\right|$$

is tenable for each UPS module. The individual output current of the $i^{th}$ UPS module is expressed by $\overrightarrow{I_{Li}} = |\overrightarrow{I_{Li}}|(\cos\theta_i + j\sin\theta_i)$. If the cross current is not large, the individual output current can be further rearranged as follows:

$$\overrightarrow{I_{Li}} = |\overrightarrow{I_{Li}}|(\cos\theta_i + j\sin\theta_i) \quad (5)$$
$$= \left[\frac{|\overrightarrow{I_L}|}{n}(\cos\theta_i + j\sin\theta_i) + |\Delta\overrightarrow{I_{Li}}|(\cos\alpha_i + j\sin\alpha_i)\right]$$

Therefore, the output power $S_i(t)$ of the $i^{th}$ UPS module is calculated by equations:

$$S_i(t) = P_i(t) + jQ_i(t) \quad (6)$$
$$= |\overrightarrow{V_o}| \cdot |\overrightarrow{I_{Li}}|(\cos\theta_i + j\sin\theta_i)$$
$$= |\overrightarrow{V_o}| \cdot \left[\frac{|\overrightarrow{I_L}|}{n}(\cos\theta_i + j\sin\theta_i) + |\Delta\overrightarrow{I_{Li}}|(\cos\alpha_i + j\sin\alpha_i)\right]$$
$$= |\overrightarrow{V_o}|\frac{|\overrightarrow{I_L}|}{n}[\cos\theta_i + j\sin\theta_i] + |\overrightarrow{V_o}||\Delta\overrightarrow{I_{Li}}|[\cos\alpha_i + j\sin\alpha_i]$$

wherein the active power $\Delta P_i$ and the reactive power $\Delta Q_i$ caused from the cross current are respectively expressed as follows:

$$\Delta P_i = |\overrightarrow{V_o}||\Delta\overrightarrow{I_{Li}}|\cos\alpha_i$$

$$\Delta Q_i = |\overrightarrow{V_o}||\Delta\overrightarrow{I_{Li}}|\sin\alpha_i$$

Moreover, the generation of the cross current $\Delta\overrightarrow{I_{Li}}$ is deemed as a voltage difference, obtained by the output voltage $\overrightarrow{V_{oi}}$ of the $i^{th}$ UPS module and the composed output voltage $\overrightarrow{V_o}$, acts on the internal impedance $\overrightarrow{Z_{oi}}$. The cross current $\Delta\overrightarrow{I_{Li}}$ is represented by:

$$\Delta\overrightarrow{I_{Li}} = |\Delta\overrightarrow{I_{Li}}|(\cos\alpha_i + j\sin\alpha_i) \quad (9)$$
$$= \frac{\overrightarrow{V_{oi}} - \overrightarrow{V_o}}{\overrightarrow{Z_{oi}}} = \frac{|\overrightarrow{V_{oi}}|[\cos\delta_i + j\sin\delta_i] - |\overrightarrow{V_o}|}{|\overrightarrow{Z_{oi}}|(\cos\xi_i + j\sin\xi_i)}$$

If the phase of the output current of the $i^{th}$ UPS module is shifted with an angle, the cross current would be accordingly shifted with the same angle. Therefore, equation (9) could be rewritten as follows:

$$\Delta\overrightarrow{I_{Li}} = |\Delta\overrightarrow{I_{Li}}|[\cos(\alpha_i - \beta) + j\sin(\alpha_i - \beta)] \quad (10)$$
$$= \frac{\overrightarrow{V_{oi}} - \overrightarrow{V_o}}{\overrightarrow{Z_{oi}}}$$
$$= \frac{[|\overrightarrow{V_{oi}}|\cos(\delta_i - \xi - \beta) - |\overrightarrow{V_o}|\cos(\xi + \beta)] + j[|\overrightarrow{V_{oi}}|\sin(\delta_i - \xi - \beta) + |\overrightarrow{V_o}|\sin(\xi + \beta)]}{|\overrightarrow{Z_{oi}}|}$$

Based on equation (10), if the summation of angle and $\xi_i$ is designed to approximate $$\frac{\pi}{2},$$

the active power and the reactive power calculated by the shifted cross current are respectively represented with equations (11)(12) and represent as a linear function.

$$\Delta VP_i = |\overrightarrow{V_o}||\Delta\overrightarrow{I_{Li}}|\cos(\alpha_i - \beta) = \frac{|\overrightarrow{V_o}||\overrightarrow{V_{oi}}|}{|\overrightarrow{Z_{oi}}|}\sin\delta_i \quad (11)$$

$$\Delta VQ_i = |\overrightarrow{V_o}||\Delta\overrightarrow{I_{Li}}|\sin(\alpha_i - \beta) = \frac{|\overrightarrow{V_o}||\overrightarrow{V_{oi}}|\cos\delta_i - |\overrightarrow{V_o}|^2}{|\overrightarrow{Z_{oi}}|} \quad (12)$$

From the above description, it can be understood that if a proper angle is chosen to complement the angle $\xi_i$ to meet the demand $$(\beta + \xi_i) = \frac{\pi}{2},$$

the foregoing equations (11) and (12) are obtained to simulate a actual inductor being coupled at the output of the UPS module.

When the droop method is then applied to modify equations (11) and (12), the output frequency $\omega_i^*$ and the amplitude $V_i^*$ of the output voltage both are expressed by:

$$\omega_i(t) = \omega_0 - k_\omega * VP_i(t) = \omega_0 - k_\omega * |\overrightarrow{V_o}||\overrightarrow{I_{Li}}|\cos(\theta_i - \beta) \quad (13)$$
$$= \omega_0 - k_\omega * |\overrightarrow{V_o}|\left[\frac{|\overrightarrow{I_L}|}{n}\cos(\theta_i - \beta) + |\Delta\overrightarrow{I_{Li}}|\cos(\alpha_i - \beta)\right]$$
$$= \left\{\omega_0 - k_\omega * |\overrightarrow{V_o}|\frac{|\overrightarrow{I_L}|}{n}\cos(\theta_i - \beta)\right\} - k_\omega * |\overrightarrow{V_o}||\Delta\overrightarrow{I_{Li}}|\cos(\alpha_i - \beta)$$
$$\approx \omega_i^* - k_\omega * \Delta VP_i$$

$$V_i(t) = V_0 - k_V * VQ_i(t) = \omega_0 - k_v * |\overrightarrow{V_o}||\overrightarrow{I_{Li}}|\sin(\theta_i - \beta) \quad (14)$$
$$= V_0 - k_v * |\overrightarrow{V_o}|\left[\frac{|\overrightarrow{I_L}|}{n}\sin(\theta_i - \beta) + |\Delta\overrightarrow{I_{Li}}|\sin(\alpha_i - \beta)\right]$$
$$= \left\{V_0 - k_v * |\overrightarrow{V_o}|\frac{|\overrightarrow{I_L}|}{n}\sin(\theta_i - \beta)\right\} - k_v * |\overrightarrow{V_o}||\Delta\overrightarrow{I_{Li}}|\sin(\alpha_i - \beta)$$
$$\approx V_i^* - k_v * \Delta VQ_i$$

wherein the symbol $\omega_i^*$ represents the static output frequency while the UPS module is coupled with a load, and $V_i^*$ means the static output voltage while the UPS module is coupled with a load.

As shown in equation (13), if $\Delta VP_i$ is greater than zero, it means the UPS module provides much more power than its expected power. Therefore, the frequency is adjusted to be lower and much closer to $\omega_i^*$. Otherwise, if $\Delta VP_i$ is smaller than zero, it means the UPS module provides less power than its expected power. Therefore, the frequency is adjusted to be higher and much closer to $\omega_i^*$. Such an adjustment can also be applied to the $\Delta VQ_i$ and $V_i^*$ as shown in equation (13).

With reference to FIGS. 5A–5B again, the implementation of the foregoing method is performed by the parallel redundant configuration. The control unit (30) is a digital signal processor (DSP), and programs are designed in the DSP to execute a current shift method.

Figure 9:
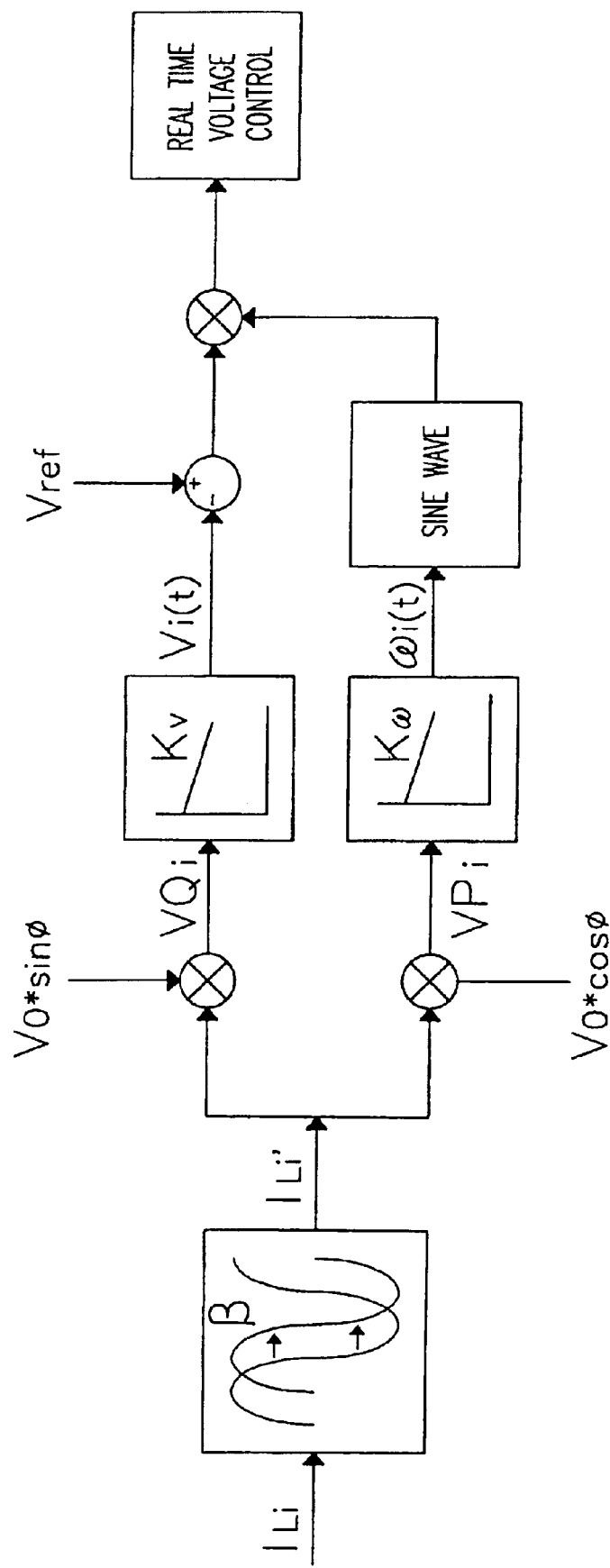
FIG. 9 is a functional block diagram of a current shift method.

With reference to FIGS. 8 and 9, after the load current detector ($I_{Li}$) senses the output current ($I_{Li}$) of the UPS module, the sensed current is provided to the DSP (30). The DSP (30) shifts the phase of the sensed current ($I_{Li}$) with an angle β to derive a shifted current ($I_{Li}'$). The shifted current ($I_{Li}'$) is then multiplied by two values ($V_o^* \cos \phi$ and $V_o^* \sin \phi$), both of which are decomposed from the output voltage $V_o$, to derive the reactive power VQi and the active power VPi. The reactive power VQi is then modified according to the P–ω) relationship to adjust the output frequency, and the reactive power VPi is modified by Q–V relationship to adjust the output voltage.

In accordance with FIGS. 5A–5B, the present invention not only applies to a parallel redundant power system constructed by multiple UPS modules, but also allows a new UPS module to join in an established parallel redundant power system. Allowing the new UPS module to join in an already existing power system is deemed as that the AC voltage output of the UPS module is able to be coupled with the mains in parallel, thus the parallel operation of the UPS module and the mains are workable. Moreover, through the modification of P–ω, the rate of load sharing among the UPS modules and mains is able to be properly distributed. Generally, when the output of the parallel redundant power system is coupled with the mains to supply power to the load, the mains will output higher power than the power system because of the reliability consideration.

From the foregoing description, in the aspect of physical meaning, the current shift method simulates a actual inductor being coupled to the output of the UPS module in such a manner that a proper angle β is applied to complement the phase of the internal impedance of the UPS module. Thereby, an expensive and bulky actual inductor is no longer required; moreover the droop method is still satisfactory. That is, the present invention not only performs the objective of the connectionless parallel operation, but also eliminates the drawbacks, such as large size and heavy weight, otherwise caused by the actual inductor.

The foregoing description of the preferred embodiments of the present invention is intended to be illustrative only and, under no circumstances, should the scope of the present invention be so restricted.

What is claimed is:

1. A control method for a parallel redundant power system that contains at least one UPS module or an inverter coupled to a load through a bus so as to supply power to the load, the method comprising:

using a droop method that utilizes a P–ω (active power-frequency) slope line and a Q–V (reactive power-output voltage) slope line to perform phase locking and current sharing; and simulating a actual inductor being coupled to the output of the UPS module or the inverter by using an internal impedance of the UPS module associated with a current shift method, whereby the virtual inductor satisfies a requirement of the droop method.

2. The method as claimed in claim 1, wherein the current shift method comprises:

sensing an output voltage of the parallel redundant power system and an output current of the at least one UPS module;

shifting a phase of the output current of the at least one UPS module with an angle, whereby a shifted output current is obtained;

calculating a reactive power and an active power based on the shifted output current; and adjusting the amplitude and the phase based on the P–ω slope line and the Q–V slope line.

3. The method as claimed in claim 1, wherein the current shift method is performed by software.

4. The method as claimed in claim 1, wherein the current shift method is performed by hardware.

5. The method as claimed in claim 1, wherein when the parallel redundant power system is coupled with mains to share the load, the rate of the output power from the mains is much greater than that from the parallel redundant power system.

6. The method as claimed in claim 1, wherein the method is applied to multiple UPS modules with inverters being coupled in parallel.

7. A parallel redundant power supply system comprising at least one UPS module or at least one inverter for supplying power to a load through a bus, wherein the at least one UPS module comprises an inverter, a PWM driver for driving the inverter, an inductor current detector coupled to the inverter, an output voltage detector, a load current detector and a control unit;

wherein the control unit utilizing a P–ω (active power-frequency) slope line and a Q–V (reactive power-output voltage) slope line of the droop method to perform phase locking and current sharing; wherein the control unit further simulates a actual inductor being coupled to the output of the at least one UPS module by using an internal impedance of the UPS module associated with a current shift method, whereby the virtual inductor satisfies a requirement of the droop method.

8. The system as claimed in claim 7, wherein the current shift method comprises:

sensing an output voltage of the parallel redundant power system and an output current of the at least one UPS module;

shifting a phase of the output current of the at least one UPS module with an angle, whereby a shifted output current is obtained;

calculating a reactive power and an active power based on the shifted output current; and adjusting the amplitude and the phase based on the P–ω slope line and the Q–V slope line.

9. The system as claimed in claim 7, wherein the control unit is a digital signal processor (DSP).

10. The system as claimed in claim 7, wherein the control unit is performed by software.

11. The system as claimed in claim 7, wherein the system further comprises a load sharing current wire, a synchronizing clock signal wire and a communication wire to allow multiple parallel UPS modules to be operated by a wire-connected mode, wherein the load sharing current wire is provided to exchange output current information among the multiple parallel UPS modules;

wherein the synchronizing clock signal wire outputs a synchronizing signal to phase lock of the multiple parallel UPS modules;

wherein the communication wire is used to control information exchange among the multiple parallel UPS modules.

12. The system as claimed in claim 11, wherein the load sharing current wire is coupled to each load current detector of the multiple parallel UPS modules.

13. A UPS module comprising an inverter, a PWM driver for driving the inverter, an inductor current detector coupled to the inverter, an output voltage detector, a load current detector and a control unit;

wherein the control unit utilizing a P-ω (active power-frequency) slope line and a Q-V (reactive power-output voltage) slope line of the droop method to perform phase locking and current sharing; wherein the control unit further simulates an actual inductor being coupled to the output of the UPS module by using an internal impedance of the UPS module associated with a current shift method, whereby the virtual inductor satisfies a requirement of the droop method.

14. The UPS module as claimed in claim 13, wherein the current shift method comprises:

sensing an output voltage of the parallel redundant power system and an output current of the at least one UPS module;

shifting a phase of the output current of the at least one UPS module with an angle, whereby a shifted output current is obtained;

calculating a reactive power and an active power based on the shifted output current; and adjusting the amplitude and the phase based on the P-ω slope line and the Q-V slope line.

15. The UPS module as claimed in claim 13, wherein the control unit is a digital signal processor (DSP).

16. The UPS module as claimed in claim 13, wherein the control unit is performed with software.

17. The UPS module as claimed in claim 13 further comprising a load sharing current wire, a synchronizing clock signal wire and a communication wire.

* * * * *